Sept. 19, 1961     H. VON RINTELEN ET AL     3,000,738
OPTICALLY SENSITIZED PHOTOGRAPHIC SILVER HALIDE EMULSION
Filed Jan. 31, 1956

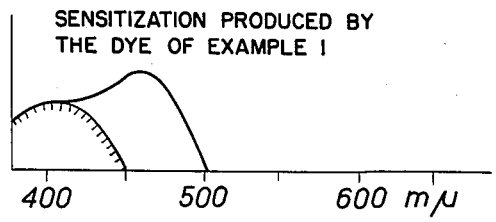

FIG.1 — SENSITIZATION PRODUCED BY THE DYE OF EXAMPLE 1

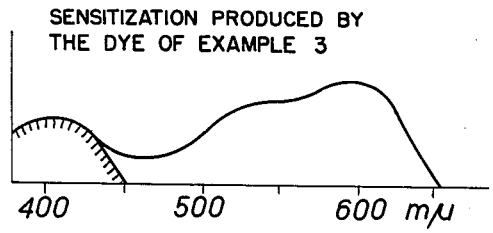

FIG.2 — SENSITIZATION PRODUCED BY THE DYE OF EXAMPLE 3

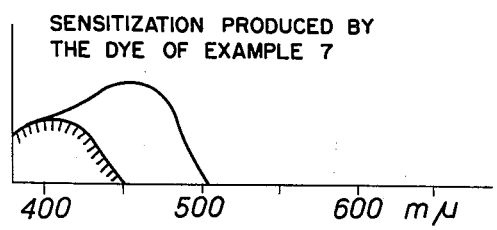

FIG.3 — SENSITIZATION PRODUCED BY THE DYE OF EXAMPLE 7

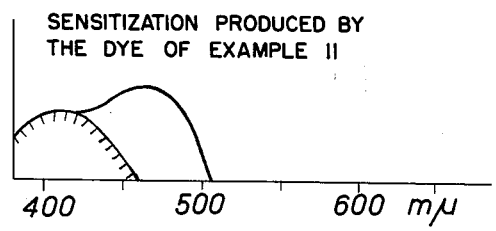

FIG.4 — SENSITIZATION PRODUCED BY THE DYE OF EXAMPLE 11

INVENTORS
OSKAR RIESTER, HARALD VON RINTELEN
BY
Connolly and Hutz
ATTORNEYS 3,000,738
OPTICALLY SENSITIZED PHOTOGRAPHIC
SILVER HALIDE EMULSION Harald Von Rintelen, Koln-Riehl, and Oskar Riester, Leverkusen, Germany, assignors to Agfa Aktiengesellschaft
Filed Jan. 31, 1956, Ser. No. 562,579
Claims priority, application Germany Feb. 7, 1955
3 Claims. (Cl. 96—102)

The present invention relates to optically sensitized silver halide emulsions and more especially to silver halide emulsions which are sensitized with cyanine dyestuffs containing a 4-mercaptopyrimidine ring.

For sensitizing photographic silver halide emulsions, it is known to use cyanine dyestuffs which contain a pyrimidine ring. However, these dyestuffs did not show any particularly good sensitizing properties, so that they have not acquired any practical importance.

Cyanine dyestuffs which contain the pyridazine ring even act as desensitizers. Furthermore, trimethine cyanines which are derived from quinazoline, which is a benzopyrimidine, according to F. M. Hamer (J. Chem. Soc., 1932, pp. 251–260) are ineffective photographically.

It has now been found that cyanine dyestuffs which contain one or more 4-mercaptopyrimidine rings are very suitable as optical sensitizers. The dyestuffs can exist as neutrocyanines or as basic cyanines. Suitable dyestuffs of this type have the general formulae:

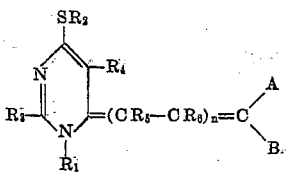

or

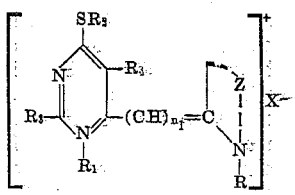

In these formulae:

R stands for alkyl (methyl, ethyl, propyl, butyl) aryl (phenyl), aralkyl (benzyl), substituted alkyl (—CH$_2$.CH$_2$.COOH, —(CH$_2$)$_4$.SO$_3$H, —CH$_2$.CH$_2$.OH) substituted aryl and aralkyl (—CH$_2$.C$_2$H$_4$.SO$_3$H), R$_1$ for alkyl or aralkyl groups, which if desired are substituted (methyl, ethyl, benzyl), R$_2$ for alkyl (such as methyl, ethyl, propyl), aryl (such as phenyl), aralkyl (such as benzyl), substituted alkyl groups, such as alkyl groups which are substituted by carboxyl groups, as for instance —CH$_2$.COOH, —CH$_2$.CH$_2$.COOH, —CH$_2$.CH$_2$.CH$_2$.COOH, aryl groups which are substituted by alkyl, R$_3$ and R$_4$ for hydrogen, alkyl, aryl, aralkyl groups, which if desired can be substituted, such as methyl, ethyl, phenyl, tolyl, chlorophenyl, benzyl, R$_5$ and R$_6$ for hydrogen, alkyl (methyl, ethyl), aryl (phenyl), A and B for atoms or groups which make a methyl or methylene group reactive and if desired can be parts of a ring system, such as CN, ester groups such as carboxy methyl, carboxy ethyl, keto groups, such as CH$_3$.CO-groups, rhodanine, thiooxazolidone, thiohydantoin, thiobarbituric acid, pyrazolone rings, Z for parts of a heterocyclic ring system, as it is ordinarily used in cyanine chemistry, such as pyridine, chinoline, thiazole, benzothiazole, naphthiazole, oxazole, benzoxazole, naphthoxazole, indole, imidazole, which rings may be substituted by common substituents, furthermore 4,6-di-mercapto pyrimidines, X for an anion, for example Cl, Br, I, CH$_3$SO$_4$ and others, $n$ for 0, 1 or 2; and $n_1$ for 1, 3 or 5.

FIGS. 1, 2, 3 and 4 each indicate the sensitivity of the silver halide emulsions as a function of the wave length of light. In these figures the dotted-line curves represent the sensitivity of the optically unsensitized emulsions and the full-line curves represent the sensitivity of the emulsions after sensitizing with the dyes of appended Examples 1, 3, 7 and 11 respectively.

For the production of these compounds, the initial substance used is a 4,6-dimercaptopyrimidine. Substances suitable as reactants for neutrocyanines are: malonic dinitrile, malonic acid esters, rhodanine, phenylmethyl pyrazolone, thiobarbituric acid, acetoacetic ester derivatives, etc.

Examples of reactants for basic cyanines are: 2- or 4-methylcycloammonium salts, such as 2-methyl-benzthiazole quaternary salt, 2-methyl-benzoxazole quaternary salt, quinaldinium salt, lepidinium salt.

The preparation of the pyrimidine ring is described in the literature. It is generally effected by alkali condensation of (substituted) malonic acid esters with amidines (formamidine, acetamidine, etc.). (J. Chem. Soc. 43, 388, 575.)

Another method is the alkali condensation of malonic acid diamide with esters, for example formic acid ethyl ester (J. Chem. Soc. 51, 2214). The 4,6-dihydroxy-pyrimidines obtained by this method can be converted (Berichte, vol. 71, page 87) into the dichloro compound by reaction with halogenation agents (PCl$_3$, POCl$_3$). The dichloro compound reacts by means of an alcoholic KSH solution to form the 4,6-dimercaptopyrimidine compound, KCl being split off. This compound can be converted into aqueous alkaline medium with, for example, dimethyl sulphate, into the 4,6-dimethyl-mercaptopyrimidine. The latter reacts with alkylation agents, such as methyl iodide, ethyl iodide, dimethyl sulphate, β-iodopropionic acid ester, p-toluene-sulphonic acid ester, and others, to form quaternary cycloammonium salts, which can be condensed in the melt or dissolved in a suitable solvent, with addition of an alkaline condensation agent (for example pyridine, triethylamine, etc.), with reactive methyl or methylene groups to cyanine dyestuffs.

Cyanine dyestuffs according to the invention show a particularly good sensitizing power and in addition are distinguished by the fact that they can be washed out satisfactorily when the photographic materials are processed, so that they do not permanently dye the layers. Furthermore, the photographic materials treated with these dyes can be stored satisfactorily, even under extreme conditions, without any loss of sensitivity.

EXAMPLE 1

Preparation of 4,6-dimethyl mercaptopyridine

A solution of 35 g. of KOH in 500 ml. of absolute alcohol is saturated with H$_2$S and 34 g. of 4,6-dichloropyrimidine are introduced while stirring. The solution which is obtained is boiled for 2 hours under reflux. The dimercaptopyrimidine is precipitated from the cooled solution and is liberated from KCl by washing with water. Yield: 30 g.

14.4 g. of the dimercapto compound are dissolved in 100 ml. of dilute caustic soda solution and 19 ml. of dimethyl sulphate are added dropwise while stirring and cooling. The precipitated product is filtered with suction and can be purified by dissolving and recrystallizing from methanol. Yield: 14 g. M.P., 119°.

The dyestuff having the following constitution:

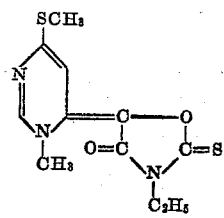

can be obtained in the following manner:

1.7 g. of 4,6-dimethyl mercaptopyrimidine are melted with 1 ml. of dimethyl sulphate in a water bath, the cooled melt is dissolved with 1.4 g. of thiooxazolidone in 10 cc. of alcohol and mixed with 1.5 ml. of triethylamine. The precipitated dyestuff is dissolved and recrystallized from methanol and has a melting point of 200° C. Sensitization range: 505 mμ, sensitization maximum: 462 mμ.

EXAMPLE 2

The dyestuff of the following constitution:

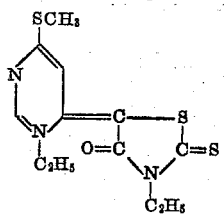

is prepared in a manner similar to that of Example 1. The quaternary salt is formed with diethyl sulphate and condensation is effected with 1.6 g. of rhodanine in alcohol with addition of 1.51 ml. of triethylamine. The dyestuff which crystallizes out can be purified by dissolving and recrystallizing from acetone. M.P. 171° C. Sensitization range: 540 mμ, sensitization maximum: 477 mμ.

EXAMPLE 3

The dyestuff of the following constitution:

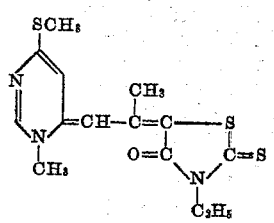

is prepared in a manner similar to that of Example 1, but 2 g. of isopropylidene rhodanine are used instead of thiooxazolidone. The dyestuff which crystallizes out can be purified by dissolving and recrystallizing from methanol-acetone—M.P. 236° with decomposition. Sensitization range 655 mμ, sensitization maximum: 605 mμ.

EXAMPLE 4

The dyestuff of the following constitution:

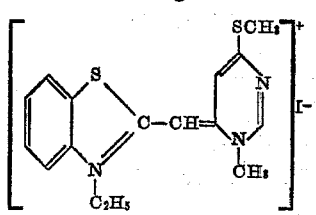

is obtained as follows:

1.7 g. of 4,6-dimethyl mercaptopyrimidine are melted with 1 ml. of dimethyl sulphate in a water bath. The cooled melt is dissolved with 3.5 g. of N-ethyl-2-methyl benzthiazolium-p-toluene sulphonate in 20 ml. of alcohol and mixed with 1.5 ml. of triethylamine. The dyestuff is precipitated by adding KI. The dyestuff can be purified by dissolving and recrystallizing from methanol. M.P. 295° with recomposition. Sensitization range: 520 mμ, sensitization maximum: 475 mμ.

EXAMPLE 5

The dyestuff of the following composition:

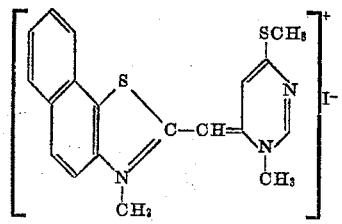

is prepared in a manner similar to Example 4, but 3 g. of 2-methyl-β-naphthiazolium methyl sulphate are used instead of 2-methyl-benzthiazolium salt. Working up takes place as in Example 4. The dyestuff dissolved and recrystallized from methanol-chloroform has a melting point of 277° with decomposition. Sensitization range: 540 mμ; sensitization maximum 488 mμ.

EXAMPLE 6

The dyestuff of the following composition:

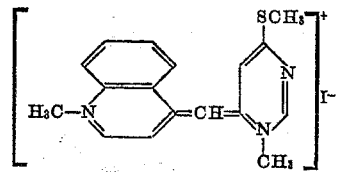

is prepared in a manner similar to that of Example 5, but 2.6 g. of lepidinium methyl sulphate are used instead of 2-methyl benzthiazolium salt. Working up takes place as in Example 5. The dyestuff is purified by dissolving and recrystallizing from ethanol-chloroform. Melting point: 283° with decomposition. Sensitization range: 580 mμ; sensitization maximum: 545 mμ.

The formula for the product of this example is somewhat different than the second generic formula given above with respect to the double bonds between the nitrogen in one ring and the nitrogens in the other. However, both sets of double bonds are equivalent and interchangeable and both sets can be considered correct. The same relationship is present in the formulae given above for the products of Examples 4 and 5.

EXAMPLE 7

The dyestuff of the following constitution:

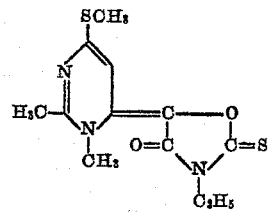

is obtained by melting 1.9 g. of 2-methyl-4,6-dimethyl-mercaptopyrimidine with 1 ml. of dimethyl sulphate. The cooled melt is dissolved with 1.4 g. of thiooxazolidine in 10 ml. of alcohol and mixed with 1.5 ml. of triethylamine. The precipitated dyestuff is purified by dissolving and recrystallizing from methanol. M.P. 208°. Sensitization range: 505 mμ; sensitization maximum: 452 mμ.

EXAMPLE 8

The dyestuff of the following constitution:

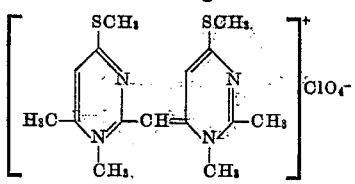

is obtained by 1.9 g. of 2-methyl-4,6-dimethyl-mercaptopyrimidine being melted with 1 ml. of dimethyl sulphate, the cooled melt being dissolved in 10 ml. of alcohol and mixed with 1.5 ml. of triethylamine. The dyestuff is precipitated with a 30% $NaClO_4$ solution and purified by dissolving and recrystallizing from methanol. M.P. 285°. Sensitization range: 535 m$\mu$; sensitization maximum: 465 m$\mu$.

EXAMPLE 9

The dyestuff of the following constitution:

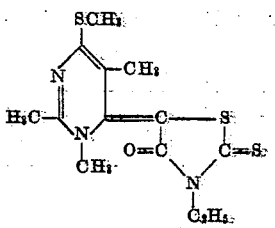

is obtained by 2 g. of 2,5-dimethyl-4,6-dimethyl-mercaptopyrimidine being melted with 1 ml. of dimethyl sulphate. The cooled melt is dissolved with 1.6 g. of N-ethyl rhodanine in 10 ml. of alcohol and the solution mixed with 1.5 ml. of triethylamine. The dyestuff formed is caused to crystallize by adding water and is purified by dissolving and recrystallizing from methanol. M.P. 185°. Sensitization range: 545 m$\mu$; sensitization maximum: 485 m$\mu$.

EXAMPLE 10

Rhodacyanines of these groups are also available by the usual methods. The dyestuff of the following constitution:

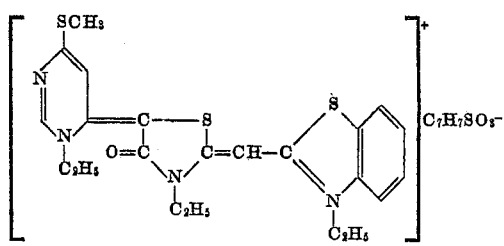

is obtained by 1 g. of the dyestuff described in Example 2 being heated with 0.5 ml. of dimethyl sulphate for 15 minutes at 120° C. The cooled melt is dissolved with 1.6 g. of 2-methyl-3-ethyl-benzthiazolium toluene sulphonate in 20 ml. of alcohol and mixed with 0.8 ml. of triethylamine. The precipitated dyestuff is purified by dissolving and recrystallizing from alcohol; M.P. 298°. Sensitization range: 600 m$\mu$; sensitization maximum: 545 m$\mu$.

EXAMPLE 11

The dyestuff of the following constitution:

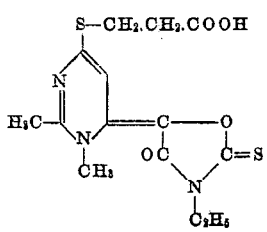

is prepared by melting 3 g. of 2-methyl-4,6-($\beta$-mercaptopropionic acid)-pyrimidine with 1 ml. of dimethylsulfate. The melt is dissolved together with 1.4 g. of 2-thio-3-ethyloxazolidone in 10 ml. of alcohol and mixed with 3 ml. of triethylamine. The dyestuff is precipitated by adding dilute acetic acid and recrystallized from methanol. M.P.: 211° C. Sensitization range: 506 m$\mu$; sensitization maximum: 452 m$\mu$.

EXAMPLE 12

The dyestuff of the following constitution:

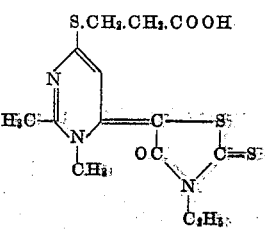

is prepared in a manner analogous to the dyestuff of Example 11. Condensation, however, is carried out with 1.6 g. of N-ethyl-rhodanine instead of thiooxazolidone. The dyestuff is purified by recrystallizing from methanol. M.P.: 205° C. Sensitization range: 592 m$\mu$; sensitization maximum: 550 m$\mu$.

EXAMPLE 13

The dyestuff of the following constitution:

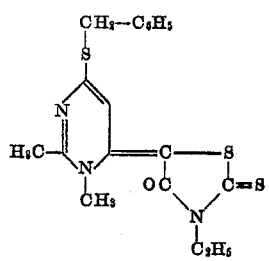

is prepared by melting 1.7 g. of 2-methyl-4,6-dibenzyl-mercaptopyrimidine with 1.5 ml. of dimethylsulfate. The melt is dissolved together with 0.8 g. of N-ethyl-rhodanine in 10 ml. of alcohol and the solution mixed with 0.8 ml. of triethylamine. The precipitated dyestuff is recrystallized with acetone. M.P. 174° C. Sensitization range: 560 m$\mu$; sensitization maximum: 490 m$\mu$.

EXAMPLE 14

The dyestuff of the following constitution:

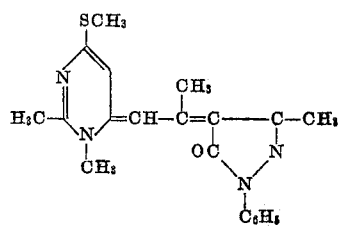

is prepared by melting 1.9 g. of 2-methyl-4,6-dimethyl-mercaptopyrimidine with 1 ml. of dimethyl sulfate. The cooled melt is dissolved together with 2.1 g. of 1-phenyl-3-methyl-4-isopropylidene-pyrazolone in 10 ml. of alcohol and mixed with 1.5 ml. of triethylamine. The precipitated dyestuff is purified by recrystallizing from methanol. M.P. 240° C. Sensitization range: 585 m$\mu$; sensitization maximum: 525 m$\mu$.

What we claim is:

1. A photographic material comprising a silver halide emulsion layer containing as an optical sensitizer a neutrocyanine dye corresponding to the formula:

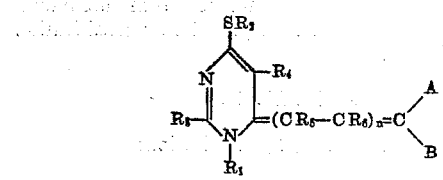

wherein $R_1$ stands for a member selected from the group consisting of alkyl and aralkyl;

$R_2$ stands for a carboxy substituted alkyl;

$R_3$ and $R_4$ stand for members selected from the group consisting of hydrogen, alkyl, aryl and aralkyl;

$R_5$ and $R_6$ stand for members selected from the group consisting of hydrogen, alkyl and aryl;

A and B stand for members selected from the class consisting of nitrile, ester and keto groups as well as groups which constitute with the carbon to which they are linked a hetero-cyclic ring system selected from the group consisting of rhodanine, thio-oxazolidone, thiohydantoin, thiobarbituric acid, and pyrazolone;

$n$ is a whole number between 0 and 2.

2. The combination of claim 1 in which the sensitizer is:

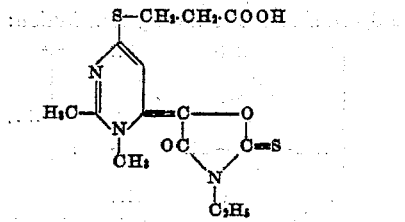

3. The combination of claim 1 in which the sensitizer is:

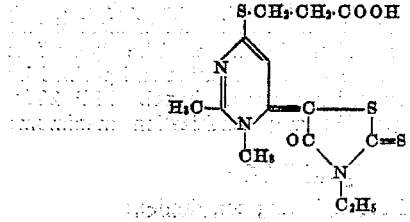

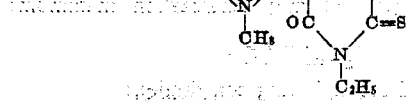

References Cited in the file of this patent
UNITED STATES PATENTS

| | | |
|---|---|---|
| 2,126,078 | Zeh et al. | Aug. 9, 1938 |
| 2,338,782 | Riester | Jan. 11, 1944 |
| 2,472,565 | Brooker et al. | June 7, 1949 |
| 2,647,053 | Vinton | July 28, 1953 |

FOREIGN PATENTS

| | | |
|---|---|---|
| 425,609 | Great Britain | Mar. 12, 1935 |

OTHER REFERENCES

Clerc: "Photography Theory and Practice," 3d English ed., Pitman Pub. Corp., New York, 1954.